United States Patent [19]

Dyer

[11] Patent Number: 4,519,493
[45] Date of Patent: May 28, 1985

[54] TURNTABLE FOR ROLLER CONVEYOR SYSTEM

[75] Inventor: Thomas A. Dyer, Greenwood, Ind.

[73] Assignee: Pentek Corporation, Indianapolis, Ind.

[21] Appl. No.: 470,205

[22] Filed: Feb. 28, 1983

[51] Int. Cl.³ .................... B65G 29/00; B65G 47/24
[52] U.S. Cl. ..................................... 198/414; 104/35
[58] Field of Search ............... 198/414, 345, 803, 859, 198/858; 104/35, 36, 38, 39, 47, 99, 127; 254/89 H, 93 HP, 421

[56] References Cited

U.S. PATENT DOCUMENTS

| | | | |
|---|---|---|---|
| 1,087,424 | 2/1914 | Bauman | 104/36 |
| 3,322,258 | 5/1967 | Wampach et al. | 198/803 |
| 3,797,636 | 3/1974 | MacDonald | 198/859 |
| 3,799,320 | 3/1974 | Bilt | 198/414 |
| 4,172,422 | 10/1979 | McBride | 104/38 |
| 4,404,505 | 9/1983 | Swanson et al. | 198/859 |

FOREIGN PATENT DOCUMENTS

| | | | |
|---|---|---|---|
| 143002 | 4/1902 | Fed. Rep. of Germany | 104/47 |
| 2501005 | 5/1975 | Fed. Rep. of Germany | 254/93 HP |

Primary Examiner—Joseph E. Valenza
Assistant Examiner—Douglas C. Voorhees
Attorney, Agent, or Firm—Barnes & Thornburg

[57] ABSTRACT

A turntable for a conveyor system has a main frame, a plurality of load-carrying rollers supported by the main frame for rotation about transverse axes to transport a load between upstream and downstream ends of the conveyor system, a lift frame supported by the main frame, a load-supporting table carried on the main frame, and glide rollers for allowing rotation of the table relative to the lift frame. Air jacks move the lift frame between a first position where the table is slightly below the load-carrying rollers to allow the load to be transported over the load-carrying rollers and a second position where the table is above the load-carrying rollers to lift the load off the load-carrying rollers. A lift-leveling mechanism provides level movement of the lift frame relative to the main frame and includes a plurality of guide plates mounted on the main frame. Each guide plate includes at least one slot, a guide bar coupled to the lift frame, a guide post engaging the slot, and linkage rods interconnecting the guide bars.

16 Claims, 7 Drawing Figures

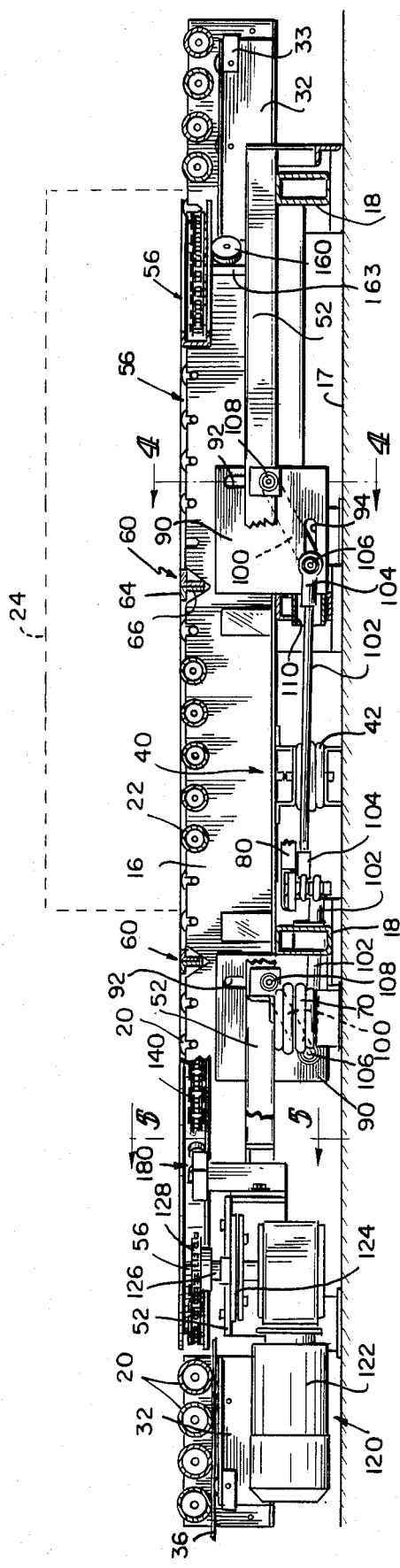

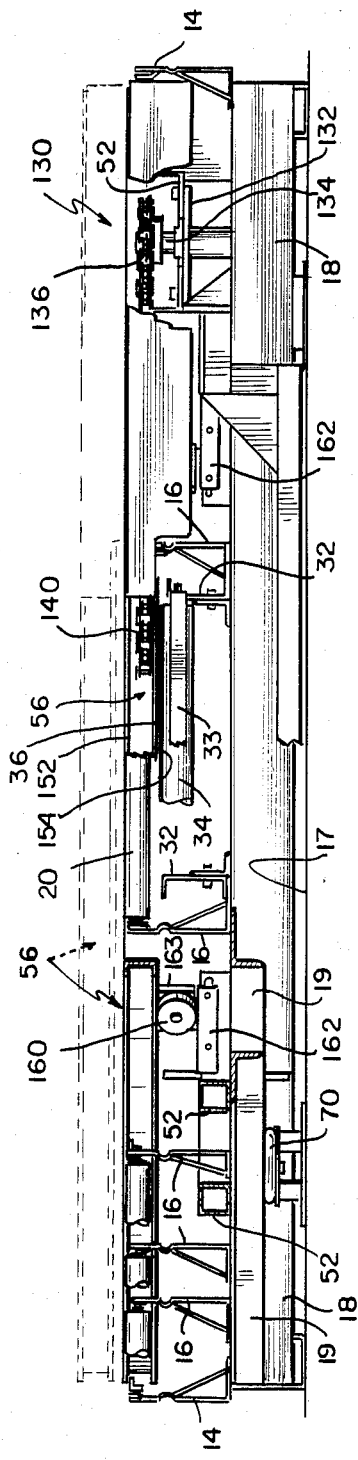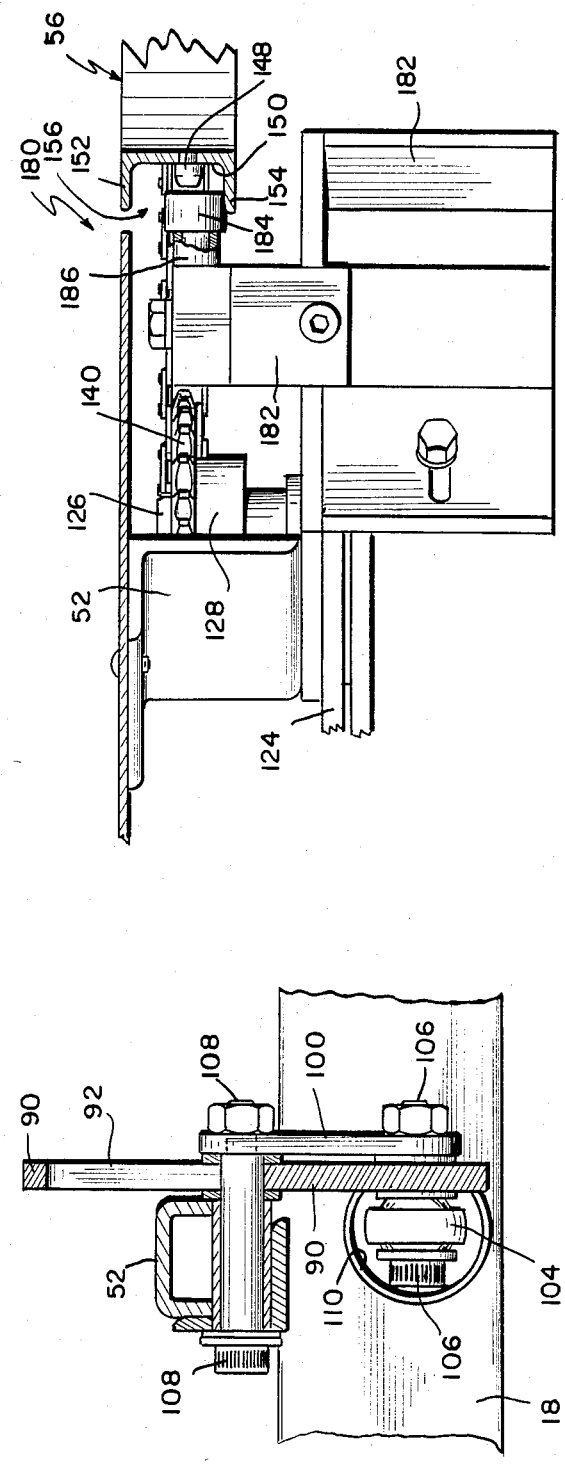

TURNTABLE FOR ROLLER CONVEYOR SYSTEM

The present invention relates to turntables for roller conveyor systems, and more particularly to apparatus improving the operation of such turntables.

Turntables for roller conveyor systems are well known to those skilled in the art. Generally speaking, a turntable conveyor section has a main frame, a plurality of load-carrying rollers supported by the main frame for transportation of loads between the upstream and downstream ends of the conveyor system, a load-supporting table, and means for raising and lowering the table. The table may be rotated manually or by a power unit.

Heretofore, turntables could not lift loads if they were off-center. The load had to be centered on the turntable before it could be lifted. With the load off-center, the turntable tilts while attempting to lift the load. The uneven distribution of the weight of the load causes stress on the mechanical connections between the turntable and the means for raising and lowering the turntable. Further, the load slips toward the periphery of the turntable because of the tilt.

Heretofore, turntables have been lifted using hydraulic systems. Previous attempts to use air bags to raise and lower turntables have been unsuccessful because of the leveling problems described above.

In addition to the leveling problem, the turntable wobbles when it is rotated. When the load is off-center, the edge of the turntable opposite the load is raised upward. When the turntable is rotated by a power unit, the wobbling causes frequent problems which result in the need to shut off the turntable.

In both manual and power rotated turntables, it is important to limit rotation in increments so that the load is properly positioned. This necessitates a positive location system for stopping the rotation of the turntable at predetermined positions, in particular, a home position. Heretofore, in both manual and powered systems, it has been necessary for an operator to supervise the operation of the turntable. For manual systems, the operator manually stopped the rotation of the turntable when he determined that the load was properly positioned. Under operator supervision, there has been no way to positively limit the rotation of the turntable in predetermined increments to properly position the load. In prior power-driven systems, the turntable has been rotated by a hydraulic system. While location of the turntable can be controlled by the hydraulic system, the turntable cannot be rotated continuously in one direction. It has heretofore been necessary to reset the turntable when all loads required rotation in the same direction.

Turntables have been used for positioning loads relative to banding machines. In a banding operation, it is important that the loads be properly aligned with respect to the banding machine. Frequently, loads transported along a conveyor system are not properly oriented with respect to the banding machines. Thus, when the loads arrive at the banding machine, it is necessary to rotate them 90°. Furthermore, it is sometimes necessary to rotate the loads 90° so that they can be banded in two directions. Operation of prior turntables with banding machines has been less than satisfactory in view of the above-described problems. It is an objective of the present invention to provide a turntable having features for solving these and other problems to improve the operation of turntables for conveyor systems.

One feature of the present invention is to provide a turntable which will lift and rotate a load that is off-center while maintaining a level load-supporting surface during lifting of the load.

Another feature of the present invention is to provide a turntable which can be continuously rotated in one direction and positively stopped at 90° increments.

Yet another feature of the present invention is to provide a turntable having a shorter cycle time than previous turntables.

A turntable embodying the present invention has a main frame, a plurality of load-carrying rollers supported by the main frame for rotation about transverse axes to transport a load between an upstream end and a downstream end of the conveyor system, a lift frame supported by the main frame, a load-supporting table carried on the lift frame, glide means allowing rotation of the load-supporting table relative to the lift frame, jack means for moving the lift frame between a first position where the load-supporting table is slightly below the load-carrying rollers to allow the load to be transported over the load-supporting table, and a second position where the load-supporting table is above the load-carrying rollers to lift the load off the load-carrying rollers, and a lift-leveling means providing level movement of the lift frame between its first and second positions.

In an illustrative embodiment, the lift-leveling means includes a plurality of guide plates mounted on the main frame. Each guide plate has a generally vertical slot and a generally horizontal slot. A guide bar has posts at each end which engage the vertical and horizontal slots. The posts engaging the vertical slots are coupled to the lift frame. The other posts engage the horizontal slots and are interconnected by linkage rods. The linkage rods, guide bars, and posts operate coincidently to ensure that each portion of the load-supporting table is raised and lowered simultaneously so that the load-supporting table remains level.

A manually rotated turntable embodying the present invention further includes a latch assembly for limiting rotation of the load-supporting table and establishing a home position. At least one tooth or detent is provided on the periphery of the load-supporting table and a latch is mounted on the lift frame adjacent the periphery of the load-supporting table. A pair of pawls are pivotally mounted on a base in opposed relationship. The pawls are yieldably urged toward the load-supporting table to capture the tooth therebetween and limit the rotation of the load-supporting table. The latch assembly further includes a release lever engaging the pawls and control means for operating the release lever to release the captured tooth.

In a preferred embodiment, a power-rotated turntable includes a series of teeth on the periphery of the load-supporting table, an endless chain for engaging the teeth, a two-speed power unit for propelling the chain, switch means for reducing the speed of the power unit when the load-supporting table is in proximity to a predetermined position and for deactivating the power unit to stop the load-supporting table in the predetermined position.

A turntable embodying the present invention also includes hold-down rollers engaging the periphery of the load-supporting table to prevent wobbling of the table during rotation.

These and other features of the present invention will become apparent from the following detailed description of a preferred embodiment, which represents the best mode of carrying out the invention as presently perceived. The description should be considered in conjunction with the accompanying drawings, in which:

FIG. 2a is a side elevational view, with portions broken away, of the turntable assembly of FIG. 1, showing the turntable in a lowered position;

FIG. 2b is a side elevational view, with portions broken away, of the turntable assembly of FIG. 1, showing the turntable in a raised position;

FIG. 3 is an end elevational view, with portions broken away, of the turntable assembly of FIG. 1, with the turntable shown in phantom in a raised position;

FIG. 4 is a sectional view, partly cross-sectioned, of the turntable assembly of FIG. 1, taken generally along lines 4—4 in FIG. 2a;

FIG. 5 is a sectional view, partly cross-sectioned, of the turntable assembly of FIG. 1, taken generally along lines 5—5 in FIG. 2a.

Figure 1:
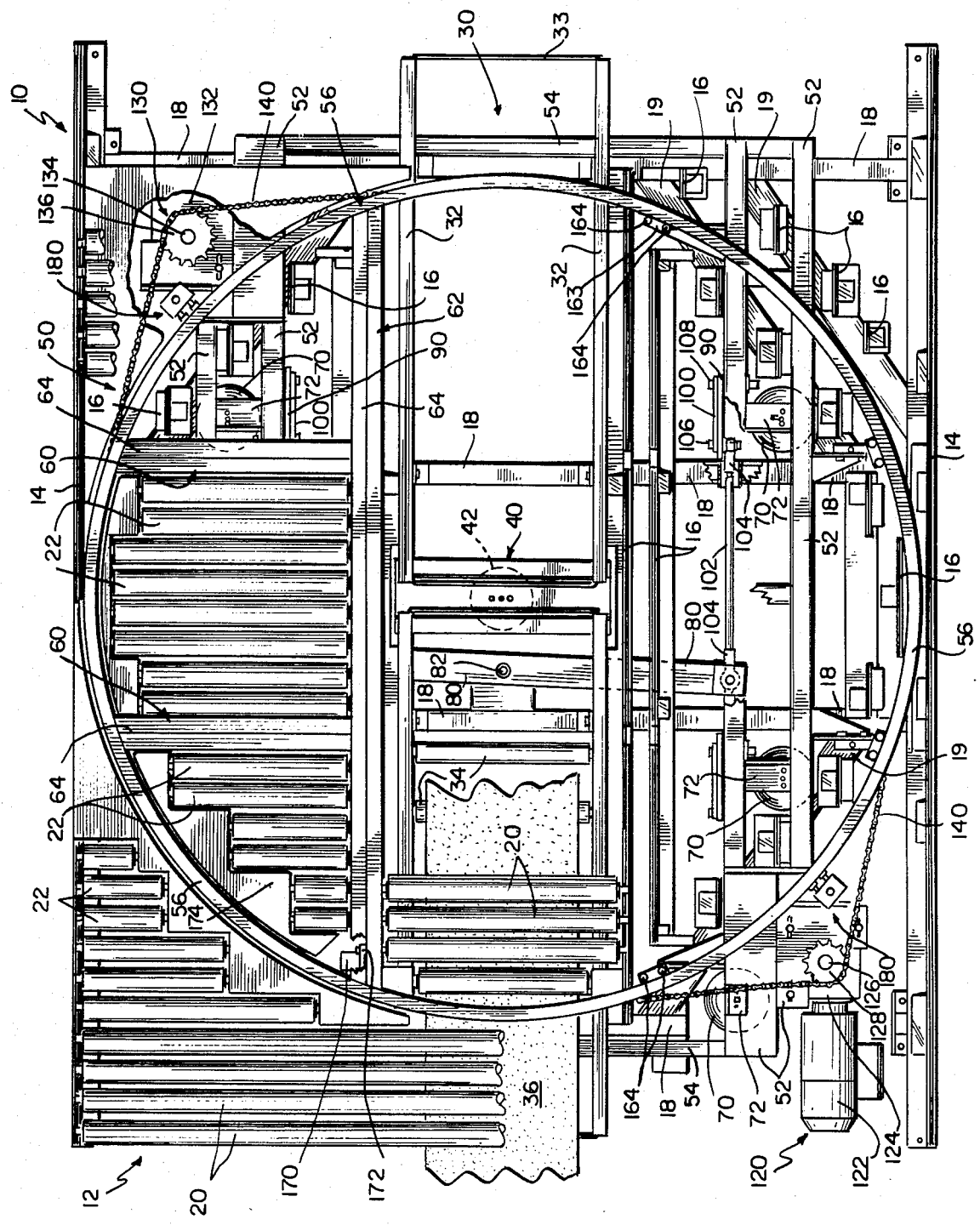
FIG. 1 is a top plan view of a turntable assembly embodying the present invention.

A powered turntable assembly 10 embodying the present invention for a conveyor system is shown in FIGS. 1, 2a, 2b, and 3. The turntable assembly 10 includes a live roller conveyor section 12 adapted for connection in a conveyor system (not shown). The conveyor section 12 has a plurality of main frame members for supporting a plurality of live and gravity load-carrying rollers 20 and 22, respectively, for rotation about transverse axes to transport a load 24 between the upstream and downstream ends of the conveyor system. The main frame members include outer side frame members 14 and inner side frame members 16 having means for engaging and supporting the rollers 20 and 22. The side frame members 14 and 16 are supported above the floor 17 by transverse support members 18 and angular support members 19. The main frame members 14, 16, 18, and 19 may be constructed in any manner suitable for supporting the load-carrying rollers without departing from the scope of the present invention. In a preferred embodiment, the main frame members 14, 16, 18, and 19 are constructed in the manner disclosed in U.S. Pat. No. 4,366,894, issued Jan. 4, 1983, and entitled "Side Frame Assembly for Roller Conveyor Systems," which is assigned to the same assignee as the present invention.

A propelling mechanism 30 engages the live load-carrying rollers 20 to transport loads over the conveyor section 12. In the illustrative embodiment, the propelling mechanism 30 includes a means for accumulating loads on the load-carrying rollers 20 and 22. The accumulating means includes pressure roller side channels 32 connected at their ends by stabilizer bars 33. A plurality of pressure rollers 34 are supported by the side channels 32. An endless drive belt 36 passes between pressure rollers 34 and the live load-carrying rollers 20. Loads are accumulated on the conveyor section 12 by an accumulator 40 which raises and lowers the side channels 32. The accumulator 40 includes an air jack 42. When the side channels 32 are raised, the pressure rollers press the endless belt 36 against the live load-carrying rollers 20. The belt 36 is propelled by a drive mechanism (not shown) to rotate load-carrying rollers 20. To accumulate loads, side channels 32 are lowered so that belt 36 is moved away from load-carrying rollers 20. Various systems for propelling rollers 20 and for accumulating loads on the conveyor section 12 may be used without departing from the scope of the present invention. In the preferred embodiment, the propelling and accumulating means are constructed in the manner disclosed in U.S. Pat. No. 4,293,065, issued Oct. 6, 1981, and entitled "Drive/Take-Up Assembly for Accumulating Live Roller Conveyor Systems," which is assigned to the same assignee as the present invention.

A turntable 50 embodying the present invention has a plurality of lift frame members supported on the main frame members 14, 16, 18, and 19. The lift frame includes longitudinal lift frame members 52 and transverse lift frame members 54. A load-supporting table includes a generally circular lift ring 56 carried by the lift frame members 52 and 54. The load-supporting table also includes generally T-shaped lift struts 60 extending transverse to the conveyor section 12 and generally T-shaped lift struts 62 extending in the longitudinal direction of the conveyor section 12. As best shown in FIG. 2a, the lift struts 60 and 62 have an upper load-engaging surface 64 and a downward extending rib 66. The lift struts 60 and 62 extend along chords of the circular ring 56 generally perpendicular to each other and are spaced apart so that in combination with the lift ring 56 they produce an upper load-engaging surface for supporting a load.

Means for raising and lowering the lift frame members 52 and 54 includes five spaced-apart air jack assemblies 70. The air jack assemblies 70 are coupled to the lift frame members 52 by coupling bars 72. Four of the air jack assemblies 70 are positioned beneath the lift ring 56 and struts 60, 62, and the fifth air jack assembly 70 is positioned beneath the power unit 122. It will be appreciated that only four air jack assemblies 70 are needed for a manually rotated turntable embodying the present invention.

As shown in FIG. 2a, when the air jacks 70 are deactivated, the load-supporting lift ring 56 and struts 60 and 62 are in a first position below the load-engaging rollers 20 and 22. Thus, loads can be transported over the load-engaging rollers 20 and 22 without interference by the turntable 50. As best shown in FIG. 1, space is provided between load-carrying rollers 20 and 22 for receiving the lift ring 56 and lift struts 60 and 62 in their first position. When air jacks 70 are activated, the lift ring 56 and struts 60 and 62 are raised upward above the load-carrying rollers 20 and 22. The turntable 50 in its raised position is shown in FIG. 2b. When the turntable 50 is raised, the ring 56 and struts 60 and 62 engage the load to lift and support it above the load-carrying rollers 20 and 22. It should be noted that the jacks 70 raise and lower the lift frame members 52 and 54, and that the lift ring 56 and struts 60 and 62 are rotatably carried on the lift frame members 52 and 54. Thus, no force is applied to the ring 56 and struts 60 and 62 during movement of the turntable 50.

Lift-leveling means providing level movement of the turntable 50 is best shown in FIGS. 1, 2a, 2b, and 4. The lift-leveling means includes a transverse pivot arm 80 pivotally connected at point 82 to the main frame of the conveyor section 12. Pivot arm 80 extends beneath the pressure roller channels 32. Four guide plates 90 are vertically mounted to the main frame members 18 in spaced-apart relationship. Two pairs of guide plates 90 are mounted in parallel relationship. The two pairs of plates 90 are mounted on each side of the pressure roller side channels 32. As best shown in FIG. 1, the guide plates are mounted adjacent to the air jacks 70 located beneath the lift ring 56 and struts 60 and 62.

Each guide plate 90 includes a vertical slot 92 formed in the upper right-hand corner of the plate 90 and a horizontal slot 94 formed in the lower left-hand corner of the plate 90. Guide bars 100 are interconnected by a plurality of linkage rods 102. Pivot connectors 104 connect the linkage rods 102 to the guide bars 100 and further connect the linkage rods 102 to the pivot arm 80. Guide posts 106 connect the guide bars 100 to pivot connectors 104. Posts 106 extend through the horizontal slots 94 and are slidable horizontally in the slots 94. Guide posts 108 extend through the vertical slots 92 and are slidable vertically in the slots 92. Guide posts 108 connect the guide bars 100 to the lift frame members 52. As best shown in FIGS. 2a, 2b, and 4, openings 110 are provided in the main frame members 18 for linkage rods 102.

The operation of the lift-leveling means can best be explained by referring to FIGS. 2a, 2b, and 4. When the jacks 70 are deactivated, lift frame members 52 and 54 are lowered so that they rest upon the main frame members 18. In this first position, guide posts 108 are moved downward in vertical slots 92 and guide posts 106 are moved to the left in FIG. 2a in horizontal slots 94. It should be noted that guide posts 106 move to the left in an opposite direction when viewing the conveyor from the side opposite to that shown in FIGS. 2a and 2b. Movement of the guide posts 108 and 106 in slots 92 and 94, respectively, is coordinated by guide bars 100, linkage rods 102 and pivot arm 80. Thus, the guide posts 106 and 108 extending through each guide plate 90 move simultaneously an equal distance so that each portion of the ring 56 and struts 60 and 62 moves the same distance to maintain a level load-supporting surface.

When jacks 70 are activated, lift frame members 52 and 54 are raised. Upward movement of lift frame members 52 and 54 moves guide posts 108 upward in slots 92. Upward movement of posts 108 pulls guide posts 106 to the right, as shown in FIG. 2b, in the horizontal slots 94. Again, guide posts 106 and 108 move simultaneously an equal distance so that each portion of the ring 56 and struts 60 and 62 moves the same distance. The lift-leveling mechanism ensures smooth and level movement of the turntable 50 between its lower (first) position (FIG. 2a) and its raised (second) position (FIG. 2b). The smooth and level operation of turntable 50 occurs regardless of the position of the load on the load-carrying rollers relative to the center of ring 56. For example, the load may be off-center relative to the ring 56, thus placing most of the weight of the load near the edge of the ring 56. However, the lift-leveling mechanism prevents tilting of the ring 56 and struts 60 and 62 to provide smooth, level lifting of the load.

A power system 120 for rotating the load-supporting ring 56 and struts 60 and 62 includes a two-speed motor 122. A mounting plate 124 connects the motor 122 to the lift frame members 52 so that the motor 122 is raised and lowered in conjunction with movement of the lift frame members 52 and 54. Motor 122 has a drive shaft 126 extending upwardly through the mounting plate 124. A drive sprocket 128 is connected to the drive shaft 126. Motor 122 may be any conventional two-speed motor. In the preferred embodiment, the motor 122 has 0.5 horsepower at high speed and 0.1 horsepower at low speed. The gear box ratio between the output of motor 122 and the drive shaft 126 is 50:1.

The power system 120 also includes an idler mechanism 130, best shown in FIGS. 1 and 3. Idler mechanism 130 includes a mounting plate 132 for mounting an idler shaft 134 to the lift frame members 52. Idler shaft 134 extends upward. An idler sprocket 136 is connected to the idler shaft 134. An endless link chain 140 engages sprockets 128 and 136 and teeth 148 on the outer periphery 150 of ring 56, as shown in FIG. 5. As further shown in FIG. 5, the outer periphery 150 of lift ring 56 has an upper flange 152 and a lower flange 154, both extending radially outward to form a radially outwardly opening channel 156 for the chain 140.

The lift ring 56 is carried on the lift frame members 52 and 54 by a plurality of vertical glide rollers 160 and horizontal glide rollers 164. Rollers 160 and 164 can best be seen in FIGS. 1, 2a, 2b, and 3. The rollers 160 and 164 are mounted to the lift frame members 52 by mounting bars 162 and mounting brackets 163 (see FIG. 3).

Lift ring 56 and struts 60 and 62 are rotatable in increments of 90°. Rotation of the lift ring 56 is controlled by two proximity sensors 170 located approximately 2 to 3 inches apart in the position shown in FIG. 1. In the preferred embodiment, the proximity sensors are proximity limit switches. The switches 170 are mounted to the lift frame members 52 by a bracket 172 and protected by a cover plate 174. To rotate lift ring 56, the motor 122 is initially activated at low speed and is shifted to high speed after a predetermined time. The lift ring 56 moves at the high speed of motor 122 until a trip bracket (not shown) mounted to a trailing strut 60 or 62 trips a first proximity sensor 170. This reduces the speed of the motor 122 to its lower speed. The lift ring 56 moves at the lower speed of motor 122 until the bracket trips the second proximity sensor 170 to deactivate the motor 122. Thus, if desirable, the lift ring 56 can be rotated 360° in 90° increments. The lift ring 56 is stopped at each 90° interval. By starting the motor 122 at its lower speed, there is less jerking of the load. Further, less amperage is drawn during start-up, allowing larger loads to be turned without stalling. The speed of rotation of the ring 56 is reduced prior to reaching the conclusion of each 90° turn so that the ring is stopped at the lower speed. This achieves more accurate stopping. Using this two-speed system, each 90° cycle takes approximately ten seconds to complete. Thus, the system also provides a shorter cycle time. Most of the turn is completed at the higher speed.

A hold-down assembly 180 for ring 56 is shown in FIG. 5. The hold-down assembly 180 includes a mounting bracket 182 connected to the lift frame members 52. Rollers 184 are mounted vertically on a pivot connection 186 so that they engage the lower flange 154 on the periphery of ring 56. As shown in FIG. 1, two hold-down assemblies 180 are employed in the present invention. One is located between the drive sprocket 128 and the lift ring 56, and the other is located between the idler sprocket 136 and the lift ring 56. This unique combination of the power unit 122, idler mechanism 130, and the hold-down assembly 180 prevents wobbling of the lift ring 56 during rotation and also holds the lift ring 56 in position with respect to the glide rollers 160 and 164.

Figure 6:
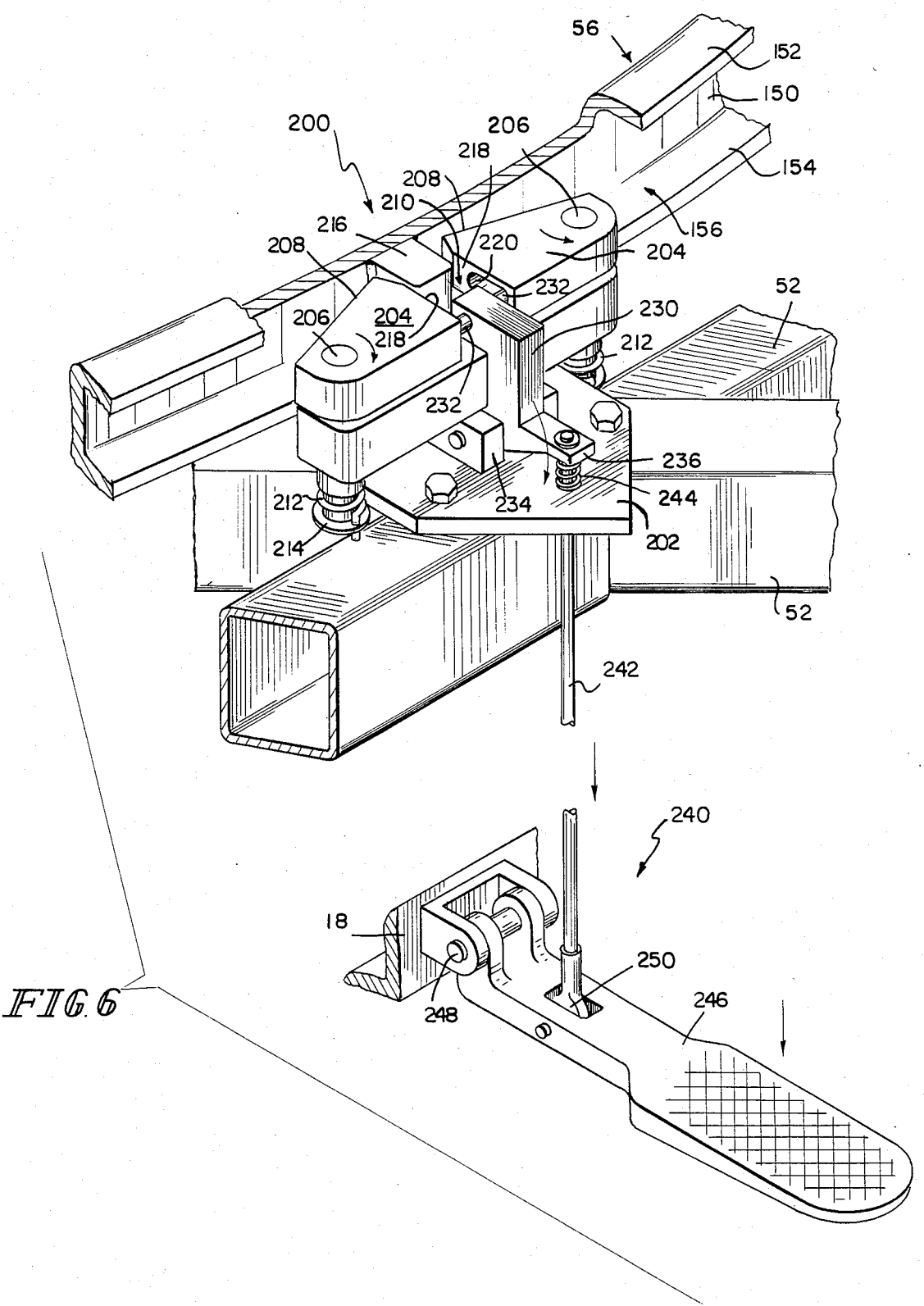
FIG. 6 is a perspective view, partly broken away and cross-sectioned, of a position latch assembly for a manual turntable assembly embodying the present invention.

In a manual turntable conveyor assembly, the lift ring 56 must be located in a home position before the lift frame members 52 and 54 are lowered. A latch assembly 200 for a manual turntable system is shown in FIG. 6. For illustrative purposes, the lift ring 56 and lift frame members 52 are shown in their raised position in FIG. 6. The latch assembly includes a base 202 mounted on lift frame members 52 adjacent to the periphery 150 of the lift ring 56. Two pawls 204 are pivotally mounted to the base 202 on pivot posts 206. The pawls 204 are mounted horizontally and elevated so that they project into the circumferential channel 156 on the periphery 150 of ring 56. Each pawl 204 includes a cam surface 208. The pawls are horizontally spaced apart to provide an opening 210 therebetween. The pawls 204 are further biased toward the ring 56 by torsion springs 212 encircling posts 206. Washers 214 are fixed to posts 206 and springs 212 engage washers 214 to spring-bias the pawls 204.

A detent or tooth 216 is provided on the periphery 150 of lift ring 56 and represents a home position for lift ring 56. It will be appreciated that more than one detent or tooth 216 may be provided on the periphery at various positions where it is desired to stop the rotation of the ring 56. As the ring 56 rotates, the detent 216 ramps along one of the cam surfaces 208 and is captured between the two pawls 204 in opening 210. When the detent 216 is captured, the ring 56 is latched in position.

Opposite surfaces 218 of pawls 204 include horizontal slots 220. A release lever 230 is pivotally mounted to base 202 and includes two posts 232 engaging slots 220. The release lever 230 is mounted on vertical pivot mountings 234 and includes a tongue 236.

An operator 240 for controlling the latch assembly 200 includes a connecting rod 242 connected to the tongue 236 of the release lever 230. A spring 244 on rod 242 is positioned between tongue 236 and base 202 when the lift ring 56 is raised, as shown in FIG. 6. Spring 244 yieldably biases the tongue 236 of release lever 230 upward. Connecting rod 242 is also connected to a foot pedal 246. Foot pedal 246 is pivotally connected to the main frame 18 by a pivot connection 248 and rod 242 is connected to the foot pedal 246 by a pivot connection 250. In order to release the detent 216 and thus allow the ring 56 to be rotated, the operator steps on foot pedal 246 which in turn pivots release lever 230 to pull pawls 204 away from ring 56. Once pawls 256 have cleared the detent 216, ring 56 can be rotated and the operator's foot can be removed from the foot pedal 246, thus allowing the pawls to again be urged toward the ring 56. When lift ring 56 is lowered, tongue 236 moves downward along rod 242 so that release lever 230 cannot be activated by stepping on pedal 246.

What is claimed is:

1. A turntable for a conveyor system comprising a main frame, a plurality of load-carrying rollers supported by the main frame for rotation about transverse axes to transport a load from an upstream end to a downstream end of the conveyor system, a lift frame supported by the main frame, a load-support table carried on the lift frame, glide means for allowing rotation of the load-support table relative to the lift frame, jack means for moving the lift frame between a first position where the load-support table is slightly below the load-carrying rollers and a second position where the load-support table is above the load-carrying rollers, and lift-leveling means providing level movement of the lift frame, the lift-leveling means including a plurality of guide means, coupled to the main frame, for guiding the lift frame as it moves between its first and second positions, and linkage means for interconnecting the guide means to cause the lift frame to be guided in a synchronized manner so that each portion of the lift frame simultaneously moves a substantially equal distance, whereby the load-support table carried on the frame remains level as the lift frame is moved between its first and second positions.

2. The turntable of claim 1 wherein the guide means includes a plurality of guide plates mounted on the main frame, each guide plate includes at least one guide slot, engaging means for engaging the slots, and coupling means for coupling the engaging means to the lift frame, the linkage means interconnecting the engaging means.

3. The turntable of claim 2 wherein each guide plate includes a generally vertical slot and a generally horizontal slot, each engaging means includes a guide bar and guide posts on the guide bar, a first guide post engages the vertical slot and is coupled to the lift frame, and a second guide post enages the horizontal slot and is coupled to the linkage means.

4. The turntable of claim 3 wherein there are four guide plates and the linkage means includes a first linkage rod interconnecting two of the second guide posts, a second linkage rod interconnecting the other two second guide posts, a pivot arm, and pivot means for connecting the pivot arm to the first and second linkage rods to cause all of the guide posts to be interconnected for synchronized movement so that each guide post simultaneously moves an equal distance in response to movement of the lift frame, whereby the load support table carried on the frame remains level as the lift frame is moved between its first and second positions.

5. The turntable of claim 1 further comprising a latch assembly for locating the load-support table in a predetermined position during one of clockwise and counter-clockwise rotation of the load-support table.

6. The turntable of claim 5 wherein the latch assembly includes at least one detent on the load-support table, a base mounted on the lift frame adjacent to the load-support table, a pair of pawls pivotally mounted on the base in opposed relationship, and means yieldably urging the pawls toward the load-support table to capture the tooth therebetween.

7. The turntable of claim 6 wherein the latch assembly further includes a release lever engaging the pawls, control means for operating the release lever to release the captured tooth.

8. The turntable of claim 1 further comprising drive means for rotating the load-support table, the drive means having two speeds, and switch means for deactivating the drive means to stop the load-support table in a predetermined position, the switch means includes a first proximity sensor for reducing the speed of the drive means from a first speed to a second speed prior to the load-support table reaching the predetermined position and a second proximity sensor for the deactivating the drive means to stop the load-support table at the predetermined position.

9. The turntable of claim 8 wherein the drive means includes teeth on the periphery of the load-support table, an endless chain for engaging the teeth, and a two-speed motor for propelling the chain.

10. The turntable of claim 9 further comprising hold-down means engaging the periphery of the load-support table to prevent wobbling of the table during rotation.

11. The turntable of claim 10 wherein the drive means further includes a drive sprocket and an idler sprocket, both engaging the chain and the hold-down means includes rollers engaging the load-support table.

12. A turntable for a conveyor system comprising a main frame, the main frame including side frame members, a plurality of load-carrying rollers supported by the side frame members for rotation about transverse axes, means for propelling the load-carrying rollers to transport a load between ends of the conveyor system, a lift frame supported by the main frame, a load-supporting table carried on the lift frame, means for accumulating the load on the load-carrying rollers, means for moving the lift frame between a first position where the load-supporting table is slightly below the load-carrying rollers and a second position where the load-supporting table is above the load-carrying rollers, means providing lift guide slots, lift-leveling bars engaging the guide slots, means for coupling the lift-leveling bars to one of the lift frame and main frame, means for linking the guide bars to each other to produce level movement of the lift frame, glide means for allowing rotation of the load-supporting table relative to the lift frame to change the position of the load on the load-carrying rollers, two-speed drive means for rotating the load-supporting table at first and second speeds, means for stopping the rotation of the load-supporting table at a predetermined position, and sensing means for reducing the speed of the drive means prior to stopping the rotation of the load supporting table at the predetermined position.

13. The turntable of claim 12 wherein the drive means includes a series of teeth on the periphery of the load-supporting table, an endless chain engaging the teeth, a two-speed motor having a drive sprocket engaging the chain, and an idler sprocket for engaging the chain opposite the drive sprocket.

14. The turntable of claim 13 further comprising hold-down rollers engaging the periphery of the load-supporting table and means for mounting the hold-down rollers on the lift frame and the drive and idler sprockets.

15. The turntable of claim 1 further comprising drive means for rotating the load support table at one of a first speed and a second speed, means for deactivating the drive means to stop the load-support table, and proximity sensor means for changing the speed of the drive means such that the speed of the rotating load-support table is reduced from a higher speed to a lower speed prior to be stopped.

16. A turntable for a conveyor system comprising a main frame, a plurality of load-carrying rollers supported by the main frame for rotation about transverse axes to transport a load from an upstream end to a downstream end of the conveyor system, a lift frame supported by the main frame, a load-support table carried on the lift frame, glide means for allowing rotation of the load-support table relative to the lift frame, jack means for moving the lift frame between a first position where the load-support table is slightly below the load-carrying rollers and a second position where the load-support table is above the load-carrying rollers, lift-leveling means providing level movement of the lift frame, and a latch assembly for locating the load-support table in a predetermined position during rotation, the latch assembly including at least one detent on the load-support table, a base mounted on the lift frame adjacent to the load-support table, a pair of pawls pivotally mounted on the base in opposed relationship, means for yieldably urging the pawls toward the load-support table to capture the tooth therebetween, a release lever engaging the pawls, and control means for operating the release lever to release the captured tooth.

* * * * *